United States Patent
Debone et al.

(10) Patent No.: US 9,989,949 B2
(45) Date of Patent: Jun. 5, 2018

(54) GRID TIED, REAL TIME ADAPTIVE, DISTRIBUTED INTERMITTENT POWER

(71) Applicants: Christopher Robert Debone, Aiea, HI (US); Steven Peter Godmere, Mililani, HI (US)

(72) Inventors: Christopher Robert Debone, Aiea, HI (US); Steven Peter Godmere, Mililani, HI (US)

(73) Assignee: E GEAR LLC, Aiea, HI (US)

( * ) Notice: Subject to any disclaimer, the term of this patent is extended or adjusted under 35 U.S.C. 154(b) by 404 days.

(21) Appl. No.: 14/846,730

(22) Filed: Sep. 4, 2015

(65) Prior Publication Data

US 2016/0070249 A1    Mar. 10, 2016

Related U.S. Application Data

(63) Continuation-in-part of application No. 14/796,987, filed on Jul. 10, 2015, and a continuation-in-part of application No. PCT/US2015/040058, filed on Jul. 10, 2015.

(60) Provisional application No. 62/130,589, filed on Mar. 9, 2015, provisional application No. 62/047,590, filed on Sep. 8, 2014.

(51) Int. Cl.
| | |
|---|---|
| G05B 19/048 | (2006.01) |
| G05B 19/042 | (2006.01) |
| H02J 3/14 | (2006.01) |
| H02J 3/18 | (2006.01) |
| H02J 3/00 | (2006.01) |

(52) U.S. Cl.
CPC ........ *G05B 19/048* (2013.01); *G05B 19/042* (2013.01); *H02J 3/14* (2013.01); *H02J 3/18* (2013.01); *H02J 2003/003* (2013.01); *Y02B 70/3225* (2013.01); *Y02E 40/30* (2013.01); *Y04S 10/54* (2013.01); *Y04S 20/222* (2013.01)

(58) Field of Classification Search
None
See application file for complete search history.

(56) References Cited

U.S. PATENT DOCUMENTS

| | | |
|---|---|---|
| 2010/0250590 A1 | 9/2010 | Galvin |
| 2011/0106321 A1 | 5/2011 | Cherian et al. |
| 2014/0018969 A1* | 1/2014 | Forbes, Jr. ............... H02J 3/32 700/295 |

* cited by examiner

*Primary Examiner* — William B Partridge
*Assistant Examiner* — Istiaque Ahmed
(74) *Attorney, Agent, or Firm* — Martin E. Hsia; Keri Ann K. S. Krzykowski

(57) ABSTRACT

A method for predicting the reactive power needs (or other power characteristic needs) for a plurality of customer circuits on an intermediate circuit operably connected to the grid by averaging measurements of utility power characteristics (such as power factor, frequency, and voltage) from a plurality of energy management controllers (or other measuring devices) connected to said customer circuits so that the utility or other grid participant can tailor its power output to meet active and reactive power needs (or other power characteristic needs) to improve transmission efficiency, increase capacity and avoid voltage fluctuations.

12 Claims, 7 Drawing Sheets

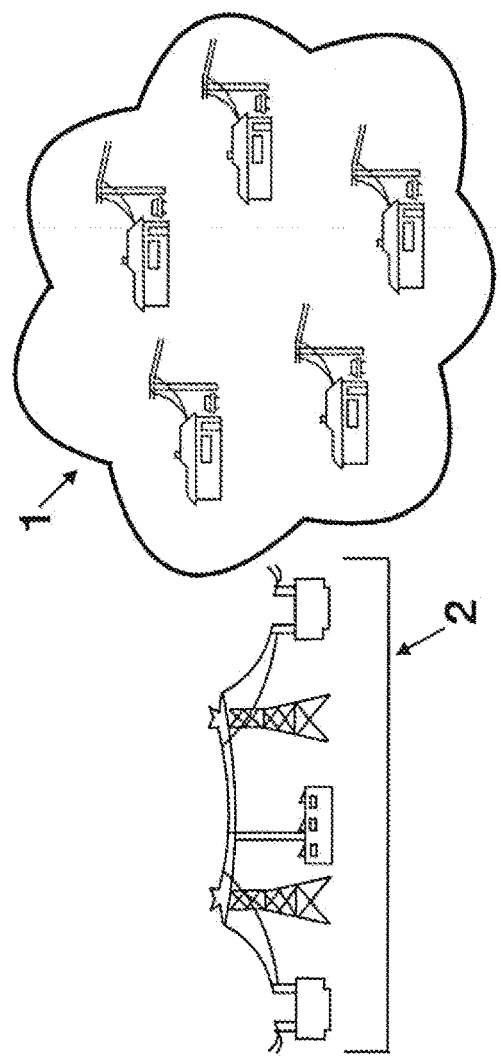
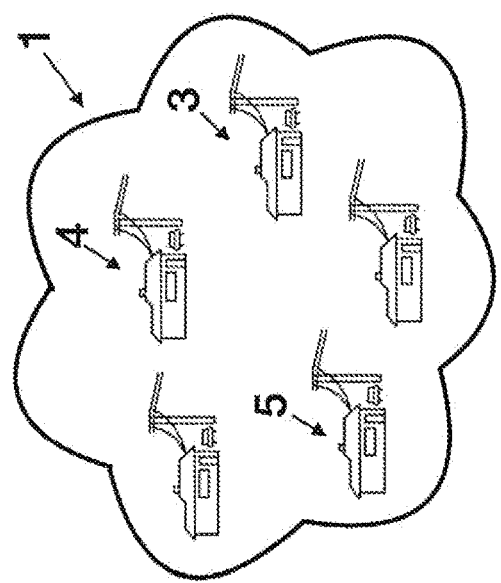
Fig.7

GRID TIED, REAL TIME ADAPTIVE, DISTRIBUTED INTERMITTENT POWER

This application is a continuation in part of and claims the priority of U.S. non provisional patent application Ser. No. 14/796,987 filed on Jul. 10, 2015, and PCT international patent application no. PCT/US2015/040058 filed on Jul. 10, 2015, both of which claim priority of U.S. provisional patent application No. 62/047,590, filed Sep. 8, 2014, and U.S. provisional patent application No. 62/130,589 filed Mar. 9, 2015.

TECHNICAL FIELD

The present invention generally relates to the management of grid-tied intermittent power (unpredictable and fluctuating amounts of power) from intermittent power generation systems (preferably power generation systems that convert renewable energy sources, including the sun, wind, waves and others into electrical energy) tied to an electric utility grid (utility grid or grid). More specifically, the invention relates to methods and devices for making customers' intermittent power generation systems and loads (including optional storage) behind the utility meter autonomously real time adaptive at the customer circuit level according to certain rules that are opted in to by the customers.

BACKGROUND ART

The means of supplying power to customers has changed drastically over the years. Early grid systems used local power generators to supply small networks with direct current (current being electrical flow) at a single voltage (electrical pressure), much like a simple flashlight where a battery powers a light. However, using direct current to transmit electrical power over long distances incurs more losses than using alternating current (current that alternately flows back and forth, towards and away from the power source). Also, transmitting electrical power at lower voltages and higher current over long distances incurs more losses than using higher voltages at lower current. Adoption of alternating current and long distance transmission of electricity at high voltage, together with advancements in transformer technology (transformers enable changes of voltages) unlocked voltage flexibility and economies of scale to allow power plants to grow and move further away from customers. Recently, there has been a dramatic increase in new and innovative grid participants (public, private and other entities that directly or indirectly generate energy, store energy, distribute energy, manage energy, aggregate energy, collect and provide information on energy, and/or perform any other energy related function or functions in front of customers' utility meters). Grid participants include, but are not limited to traditional electric utilities, energy generators, energy distributors, energy aggregators, and energy management companies.

Further, intermittent power generation systems (which preferably convert renewable energy sources, including the sun, wind, waves and others into electrical energy) have become popular as the price of oil and other conventional energy sources has increased. They are versatile and can be used at public or private properties, including residential, commercial or industrial properties. However, they usually provide direct current (so inverters must be used to connect to alternating current systems) and can cause unpredictable rapid fluctuations in electrical power generation (surges and lulls) due to unpredictable rapid fluctuations in environmental conditions, such as moving clouds, erratic changes in wind speed and direction, and changes in wave height and wave span. Unlike randomly dispersed electrical loads that are, in aggregate, similar and predictable across significant regions of a grid, intermittent power generation systems (such as photovoltaic (PV), wind, and other renewable energy systems) introduce wide ranging and instantly changing instabilities on localized segments of a grid, especially in areas where the grid is close to being saturated with connected intermittent power generation systems. Some utilities now restrict or even forbid additional connections of intermittent power generation systems to grid portions with high levels of existing connected intermittent power generation systems that are already saturated with power.

Of course, customers can go completely "off-grid" by using intermittent power generation systems that are not connected to the grid, together with energy storage devices (batteries) to store and discharge all the intermittent power produced from these stand-alone systems; however, these stand-alone systems require batteries with large amounts of storage capacity, making them very expensive. One solution to the problem of intermittent power related instabilities has been to reject intermittent power from grid-tied intermittent power generation systems during certain times of the day, sending it instead to energy storage devices, or to curtail the intermittent power generation systems during certain times of the day altogether.

Still another solution has been to give a utility centralized control over energy management controllers connected to customer circuits behind the utility meter to perform load shedding (decreasing load), load adding (increasing load), energy storage and energy export, as necessary, to manage the amount of energy exported to the grid from intermittent power generation systems. However, because of unpredictable and instantly changing intermittent power output on localized segments of a grid, customers' resistance to centralized utility control, communication delays between the controllers and the utility over distance, and other reasons, this is not a commercially viable solution.

Power factor correction is another problem for utilities (and other grid participants). By way of background, in a simple alternating current (AC) circuit consisting of an alternating current power source and a load, both the current and voltage are sinusoidal, that is, the electrical flow (current) and electrical pressure (voltage) alternate back and forth towards and away from the source, each in approximately a simple "sine" wave. If the load is purely resistive, such as in a light bulb or oven, then voltage and current remain in phase, and at every instant in a cycle, the product of voltage and current (which equals the electrical power) is positive (or zero once per cycle, when the current changes direction), indicating that only active power (or real power) is transferred (or no power is transferred once per cycle, when the current changes direction). Active power (or real power, measured in Watts) is the net power that is actually being used, or dissipated, in a circuit.

For current that flows toward the load and then returns to the source in a full AC cycle, there is no net transfer of energy, and no dissipation of real power. However, power is still needed to cause the current to flow back and forth, which is known as reactive power, which is measured in the unit of Volt-Ampere-Reactive to differentiate from real power). Put in another way, the portion of power that, over a complete cycle of the AC waveform, results in net transfer of energy in one direction is known as active power (sometimes also called real power). The portion of power which is sent out from the source and then returns to the source in each complete cycle is known as reactive power. The reactive power regulates the voltage in an AC power system, to provide enough voltage to move the active power through the system to the load. If the reactive power is too low, insufficient voltage is provided at the load. If the reactive power is too high, the system becomes overloaded. The need for excess reactive power wastes energy, reduces capacity and causes voltage fluctuations.

Inductive loads (loads that require current flowing through coils to create magnetic fields, such as transformers or motors) cause the sinusoidal wave of current to lag behind the sinusoidal wave of voltage, and capacitive loads (loads that involve charging devices with electricity) cause the sinusoidal wave of current to lead the sinusoidal wave of voltage. Inductive loads, capacitive loads, and other loads that cause the current to lead or lag the voltage, are called reactive loads. Causing the current to lead or lag the voltage causes the current to be "out of phase" with the voltage: current arrives at the wrong time to do work efficiently (either too early or too late), which increases the need for reactive power to move the active power.

Power factor is a measure of the efficiency of the power being used in an AC circuit and is the ratio of real power (measured in Watts (W)) to apparent power (the power that is supplied to the circuit, consisting of the sum of real power and reactive power, measured in Volt-Amperes (VA)). The power factor of a circuit is 1 when the voltage and current are in phase, and it is less than 1 when the current leads or lags the voltage, so they are out of phase—being out of phase creates reactive load. A high power factor at or near 1 is generally desirable in an electrical transmission system to reduce transmission losses and improve voltage regulation.

Loads at residential, commercial, industrial or other properties are typically a combination of resistive loads (heating devices) and inductive loads (motors and transformers), so that current usually lags behind voltage due to the inductive loads. Charging and discharging power storage devices, such as batteries, can create a capacitive load to help control power factor in these typical combinations.

Power factor correction brings the power factor of circuits closer to 1 by supplying reactive power of opposite sign, or by adding capacitive load (rechargeable battery systems), or by adding inductive load.

For example, to correct lagging power flow in a typical AC customer circuit with resistive and inductive loads, leading reactive power can be supplied to bring the current into phase with voltage. Or a capacitive load from battery charging can be added to help bring the current into phase with voltage. Inductive loads could also be turned off to reduce lagging power flow.

When the current is in phase with voltage, there is a reduction in transmission losses, an increase in system capacity, and a rise in voltage (preventing an undervoltage problem). Thus, reactive power can be supplied by a rechargeable battery storage system and can also be adjusted by turning on and off loads at a home.

The ability of the utility (or other grid participant) to accurately predict the reactive power (or other power characteristics) needed for intermediate circuits is critically important because providing too much or too little reactive power in electrical grids can lead to overvoltage or undervoltage conditions, and under certain operating conditions, to the complete collapse of the grid (blackout). An overvoltage or undervoltage condition is considered to be reached when the voltage rises above or lags below the nominal voltage by ten percent (10%) for more than 1 minute.

Utilities (or other grid participants) are, however, typically unaware of how much reactive power is required for individual customer circuits connected to an intermediate circuit because the utility (or other grid participant) usually cannot measure reactive power at a level lower than intermediate circuits, and especially behind customers' utility meters. Further, the reactive power for one customer on an intermediate, circuit may not have any relationship to the reactive power for any other customer on the same intermediate circuit. Accordingly, the utility for other grid participant) can only guess how much reactive power in the aggregate to supply to customers on an intermediate circuit.

The following patents and patent applications may be relevant to the field of the invention:

U.S. Pat. No. 8,855,829 B2 to Golden et al., incorporated herein by reference, discloses a system and method for managing power consumption and storage in a power grid. Measurements are received from a plurality of geographically distributed energy management controllers. Each energy management controller has energy storage units with stored energy. The measurements comprise the energy production and storage capacity of the energy management controllers and their associated energy storage units. The measurements are processed, for example aggregated and displayed on a graphical user interface. Commands are transmitted to a first subset of the energy management controllers to command the units to discharge their stored energy into a power grid through an inverter. Commands are transmitted to a second subset of the plurality of energy management controllers to store energy in each unit's energy storage unit.

U.S. Pat. No. 8,552,590 B2 to Moon et al., incorporated herein by reference, discloses an energy management system, including: a first interface configured to receive a first power from a power generation system; a second interface configured to couple to the power generation system, a power grid, and a storage device, and to receive at least one of the first power from the power generation system, a second power from the power grid, or a third power from the storage device, and to supply a fourth power to at least one of the power grid or a load; and a third interface configured to receive the third power from the storage device, and to supply a fifth power to the storage device for storage.

U.S. Patent Application Publication No. US 20130162215 A1 to Cooper, incorporated herein by reference, discloses a method of managing the consumption and distribution of electricity in a user facility, wherein the user facility is connected to an electricity supply grid and the user facility comprises a grid connected to an on-site generator; the method comprising the steps of measuring waveform conditions on a portion of the electricity supply grid adjacent the user facility to obtain locally measured waveform conditions; measuring electrical power readings from the on-site generator; communicating the locally measured waveform conditions and the electrical power readings to a controller in the user facility; determining, at least on the basis of the locally measured waveform conditions, whether the electricity supply grid is oversupplied or undersupplied with electricity; and, modifying the flow of the electricity within the user facility based on whether the electricity supply grid is oversupplied or undersupplied with electricity and/or the electrical power readings from the grid connected on site generator.

U.S. Pat. No. 8,558,991 B1 to Forbes. Jr., incorporated herein by reference, discloses systems, methods, and apparatus embodiments for electric power grid and network registration and management of active grid elements. Grid elements are transformed into active grid elements following initial registration of each grid element with the system, preferably through network-based communication between the grid elements and a coordinator, either in coordination with or outside of an IP-based communications network router. A multiplicity of active grid elements function in the grid for supply capacity, supply and/or load curtailment as supply or capacity. Also preferably, messaging is managed through a network by a Coordinator using IP messaging for communication with the grid elements, with the energy management system (EMS), and with the utilities, market participants, and/or grid operators.

U.S. Patent Application Publication No. US 20140018969 A1 to Joseph W. Forbes, Jr., incorporated herein by reference, discloses systems and methods for managing power supplied over an electric power grid by an electric utility and/or other market participants to a multiplicity of grid elements and devices for supply and/or load curtailment as supply, each of which having a Power Supply Value (PSV) associated with its energy consumption and/or reduction in consumption and/or supply, and wherein messaging is managed through a network by a Coordinator using IP messaging for communication with the grid elements and devices, with the energy management system (EMS), and with the utilities, market participants, and/or grid operators.

U.S. Pat. No. 8,457,802 B1 to Steven et al., incorporated herein by reference, discloses assisting customers in managing the four types of energy assets, that is, generation, storage, usage, and controllable load assets. Embodiments of the present invention for the first time develop and predict a customer baseline ("CBL") usage of electricity, using a predictive model based on simulation of energy assets, based on business as usual ("BAU") of the customer's facility. The customer is provided with options for operating schedules based on algorithms, which allow the customer to maximize the economic return on its generation assets, its storage assets, and its load control assets. Embodiments of the invention enable the grid to verify that the customer has taken action to control load in response to price. This embodiment of the invention calculates the amount of energy that the customer would have consumed, absent any reduction of use made in response to price. Specifically, the embodiment models the usage of all the customer's electricity consuming devices, based on the customer's usual conditions. This model of the expected consumption can then be compared to actual actions taken by the customer, and the resulting consumption levels, to verify that the customer has reduced consumption and is entitled to payment for the energy that was not consumed.

U.S. Patent Application Publication No. US 2011/0093127 A1 to Kaplan et al, incorporated herein by reference, discloses a Distributed Energy Resources Manager to connect electrical assets in an electricity distribution grid with other information-processing systems including, but not limited to, existing utility grid management systems to manage flows of information between electrical assets and interacting software assets and, thereby, manage performance of at least the electrical assets.

DISCLOSURE OF THE INVENTION

The present invention relates to methods and devices for enabling power generation customers to make their intermittent power generation systems (preferably photovoltaic (PV), wind, and other renewable energy systems), loads, and optional energy storage autonomously real time adaptive at the customer circuit level by connecting energy management controllers (controllers), behind a customer's utility meter on the customer's circuit, to the customer's charger/inverter (which is connected directly or indirectly to the customer's power generation system and optional storage device) and to controlled load portions of that customer's varying load, to autonomously direct, in real time, generated power to storage or to that customer's controlled load, or to autonomously discharge, in real time, stored power from storage, or to autonomously shed, in real time, portions of that customer's controlled load, to meet (after powering that customer's varying load) a grid participant's or customer's desired outcome for that customer's circuit. The controllers are preferably downloadably connected directly or indirectly to the grid participant. The charger/inverter in the present invention would only be an inverter if there was no storage device.

For purposes of this disclosure, a "grid participant" is preferably any public, private or other entity that directly or indirectly generates energy, stores energy, distributes energy, manages energy, aggregates energy, collects and provides information on energy, and/or performs any other similar function or functions in front of customers' utility meters, and includes, but is not limited to, traditional electric utilities, energy generators, energy distributors, energy aggregators, and energy management companies. Further, a "utility grid" or "grid" is a network of connections to provide power to multiple customers, which may or may not include a centralized power source, such as a utility.

The energy management controllers of the present invention can be implemented in any manner known to a person of ordinary skill in the art, including software implemented on a computer. They can also be configured in several different ways, including but not limited to energy management controllers for each device or load being controlled (for example, controlled loads, critical loads or other loads, including storage devices and charger/inverters), or as a single energy management controller for a customer circuit that remotely controls controllable switches at each device or load being controlled (for example, controlled loads, critical loads or other loads, including storage devices and charger/inverters).

Moreover, each energy management controller preferably acts autonomously from the grid participant and also autonomously from each other. No two controllers experience the same conditions and/or fluctuations in intermittent power generation and varying loads on their customer circuits so each can preferably react and adapt autonomously in real time to its unique circumstances.

Preferably, the grid participant can periodically update and download selected grid participant parameters (rules) to the controllers for achieving the grid participant's desired outcome for that customer's circuit, the grid participant's desired aggregate outcomes for all customers on an intermediate circuit, or the grid participant's desired aggregate outcome for the grid, but customers elect the degree to which to enable real-time adaptiveness of their customer circuits to achieve the grid participant's desired outcomes, by opting in to all, some, or none of the rules. The energy management controllers are optionally controllable directly by the customer, or by a separate customer computer with a user interface (connected to the customers' energy management controllers), through which a customer can opt in to all, some or none of the grid participant rules. Further, the energy management controllers can optionally forego making customers' intermittent power generation systems and loads (including optional energy storage) real-time adaptive at the customer circuit level, and accept and act according to grid participant rules that require centralized control by the energy grid participant at times defined and established by the energy grid participant.

For purposes of this disclosure, an "intermediate circuit" can be any circuit between the customer circuit and the grid participant, including without limitation transformers, neighborhood circuits, substations, and sub-transmission substations. Further, practically, "real time" means within, fifteen seconds, preferably it means within 10 seconds, and optimally it means within one second or less.

The present invention is preferably a first method for managing load on a grid operably attached to a grid participant that provides power to customers through a plurality of intermediate circuits, wherein each customer has a varying load on a customer circuit that is behind a utility meter connected at a common connection to one of the intermediate circuits, preferably comprising: providing energy management controllers (or controllers) to controlled load customers to enable each controlled load customer to controllably switch in real time selectable controlled load portions of the varying load of that controlled load customer, by connecting or disconnecting the controlled load portions from the customer circuit in real time, whereby the controller allows shedding of load shedding parts, and adding of load adding parts, of the controlled load portions of that controlled load customer in real time behind the utility meter; wherein the controllers for each controlled load customer are preferably downloadably connected to the grid participant so that the grid participant can download to the controllers grid participant rules for achieving the grid participant's desired outcome for the intermediate circuit of that controlled load customer; wherein certain of the controlled load customers are preferably power generation customers, who each has an intermittent power generation system that provides unpredictably fluctuating generated power to that power generation customer's customer circuit; preferably detecting in real time changes in each power generation customer's varying load and unpredictably fluctuating generated power; wherein, in real time response to detected excesses in power to meet a power generation customer's varying load and desired outcome on that power generation customer's customer circuit, the controllers for that power generation customer's customer circuit preferably autonomously connect the power generation customer's intermittent power generation system to the load adding parts to add sufficient load in real time to absorb the excesses behind the utility meter; wherein, in real time response to detected deficiencies in power to meet the power generation customer's varying load and desired outcome on that power generation customer's customer circuit, the controllers for that power generation customer's customer circuit preferably autonomously disconnect the load shedding parts to shed sufficient load in real time to reduce the deficiencies behind the utility meter; whereby autonomously connecting and disconnecting the load adding parts and the load shedding parts behind the meter in real time according to the grid participant rules preferably contributes to making the power generation customers' customer circuits autonomously real time adaptive to conform to the grid participant rules.

The controllers for each controlled load customer are preferably associated with reference criteria for that controlled load customer. Preferably, the first method further comprises downloading the grid participant rules to at least a referenced subset of controllers selected by the reference criteria that can preferably autonomously manage in real time the controlled loads of referenced controlled load customers; wherein each of the referenced controlled load customers can preferably individually elect whether to opt-in to a particular grid participant rule, whereby referenced controlled load customers who have decided to opt-in to the particular grid participant rule are opted-in customers for the particular grid participant rule; whereby autonomous load shedding and load adding of the load shedding parts and the load adding parts in real time behind the utility meter preferably controls the opted-in customers' loads in real time according to the particular grid participant rule to preferably contribute to making the intermediate circuits for the referenced controlled load customers autonomously real time adaptive to substantially conform to the particular grid participant rule.

Preferably, the controlled load portions of controlled load customers include energy storage.

The present invention is also preferably a second method for managing load on a grid operably connected to a grid participant that provides power to customers through a plurality of intermediate circuits, wherein each customer has a varying load on a customer circuit that is behind a utility meter connected at a common connection to one of the intermediate circuits, comprising: controllably connecting energy management controllers to controlled load portions of the varying loads of controlled load customers, to preferably control the controlled load portions in real time, by autonomously connecting or disconnecting the controlled load portions from the customer circuits of the controlled load customers in real time, whereby the controllers preferably alloy autonomous load shedding and load adding of the controlled load portions in real time behind the utility meter; wherein the controllers are preferably associated with reference criteria for each controlled load customer; wherein the controllers are preferably downloadably connected to the grid participant so that the grid participant can download grid participant rules to the controllers; downloading the grid participant rules to at least a referenced subset of controllers selected by the reference criteria that can preferably autonomously manage in real time the controlled loads of referenced controlled load customers; wherein each of the referenced controlled load customers can preferably individually elect whether to opt-in to a particular grid participant rule, whereby referenced controlled load customers who have decided to opt-in to the particular grid participant rule are preferably opted-in customers for the particular grid participant rule; whereby autonomous shedding of load shedding parts, and adding of load adding parts, of the controlled load portions in real time behind the utility meter, thereby controlling the opted-in customers' loads in real time according to the particular grid participant rule, preferably contributes to making the intermediate circuits for the referenced controlled load customers autonomously real time adaptive to substantially conform to the particular grid participant rule.

The second method further is preferably such that certain of the controlled load customers are power generation customers, who each has an intermittent power generation system that provides unpredictably fluctuating generated power to that customer's customer circuit, further comprising: preferably detecting in real time changes in each power generation customer's varying load and unpredictably fluctuating generated power; wherein, in real time response to detected excesses in power to meet a power generation customer's varying load and desired outcome on that power generation customer's customer circuit, the controllers for that power generation customer's customer circuit preferably autonomously connect the load adding parts to preferably add sufficient load in real time to preferably absorb the excesses behind the utility meter; wherein, in real time response to detected deficiencies in power to meet the power generation customer's varying load and desired outcome on that power generation customer's customer circuit, the controllers for that power generation customer's customer circuit preferably autonomously disconnect the load shedding parts to preferably shed sufficient load in real time to preferably reduce the deficiencies behind the utility meter; whereby autonomously connecting and disconnecting the load adding parts and load shedding parts behind the meter in real time according to the particular grid participant rule preferably contributes to making the power generation customers' customer circuit autonomously real time adaptive to preferably conform to the particular grid participant rule and preferably contributes to making the referenced controlled load customers' intermediate circuits autonomously real time adaptive to preferably conform to the particular grid participant rule.

The present invention is also preferably an autonomously real time adaptive grid, comprising: a grid operably connected to a grid participant that provides power to customers through a plurality of intermediate circuits, wherein each customer has a varying load connected to a customer circuit, wherein each customer circuit is behind a utility meter that is connected at a common connection to one of the intermediate circuits, wherein certain of the customers are power generation and storage customers, who each has a power generation system linked to a storage device by a charger/inverter that charges the storage device using (optionally) power from the grid or generated power from the power generation system, or discharges stored power from the storage device, wherein the improvement comprises: energy management controllers preferably connected to controlled load portions of the varying loads of controlled load customers, to preferably control in real time the controlled load portions, preferably by autonomously connecting or disconnecting the controlled load portions from the customer circuits of the controlled load customers, whereby the controllers preferably allow autonomous load adding and load shedding in real time of the controlled load portions, and to preferably autonomously detect in real tune changes in the varying load due to connection and disconnection of the controlled load portions; and energy management controllers connected to controlled charger/inverters of the power generation and storage customers, to preferably autonomously control in real time the charger/inverters to preferably autonomously direct generated power to charge the storage devices, or to preferably autonomously direct generated power or stored power to the customer circuit, to preferably provide power to the controlled power generation and storage customers' varying loads, and to preferably detect in real time unpredictably fluctuating generated power of that customer's power generation system; wherein each controller is preferably associated with each controlled load customer's and each power generation and storage customer's corresponding intermediate circuit, and with reference criteria for each controlled load customer and for each power generation and storage customer; wherein the controllers can be preferably aggregated and segregated into subsets by the intermediate circuits and by the reference criteria; wherein each controller is preferably downloadably connected to the grid participant so that the grid participant can preferably download multiple selected grid participant rules to multiple selected subsets of the controllers; whereby by downloading a controlled load grid participant rule to a controlled load subset of the controllers, the controlled load subset of the controllers preferably autonomously manages hi real time the controlled load portions to preferably allow load adding and load shedding in real time according to the controlled load grid participant rule; and whereby by preferably downloading a power generation and storage grid participant rule to a power generation and storage subset of the controllers, the power generation and storage subset of the controllers preferably autonomously manages in real time the controlled power generation systems and controlled storage devices to preferably provide power to the grid at the common connection that conforms to the grid participant's desired outcomes for customer circuits of the power generation and storage subset of the controllers.

Preferably, the power generation and storage customers are a subset of the controlled load customers, but not necessarily.

In the present inventions described above, the reference criteria are preferably selected from the group consisting of the intermediate circuit to which the referenced controlled load customer or power generation and storage customer is connected, the area in which the referenced controlled load customer or power generation and storage customer is located, the type of the referenced or power generation and storage customer's intermittent power generation system, the direction the referenced power generation and storage customer's intermittent power generation system faces, the geographic characteristics of the terrain around the referenced power generation and storage customer's intermittent power generation system, the capacity of the referenced power generation and storage customer's intermittent power generation system, the type of power usage of the controlled load customer or power generation and storage customer, whether the referenced controlled load customer has energy storage, and other criteria that may cause a subset of the controlled load customers controlled loads or the power generation and storage customer's intermittent power generation system to behave differently from other controlled loads or intermittent power generation systems connected to the grid.

The present invention is also preferably a third method for reducing the instability of a grid operably connected to a grid participant that provides power to customers through a plurality of intermediate circuits, wherein each customer preferably has a varying load on a customer circuit that is behind a utility meter connected at a common connection to one of the intermediate circuits, wherein certain of the customers are preferably power generation and storage customers, who each has an intermittent power generation system that provides unpredictably fluctuating generated power to the customer circuit, preferably linked to a storage device by a charger/inverter that charges the storage device using generated power from the power generation system (or optionally the grid), or discharges stored power from the storage device to the customer circuit (or optionally the grid), comprising: controllably connecting energy management controllers behind the utility meter to control in real time controlled load portions of the varying loads of certain controlled load customers, and to detect in real time changes in the varying load of the controlled load customers, and to preferably control in real time the charger/inverters of controlled power generation and storage customers, and to preferably detect in real time unpredictably fluctuating generated power of the power generation and storage customer's power generation systems; wherein the controllers are preferably downloadably connected to the grid participant so that the grid participant can preferably periodically download selected grid participant rules for achieving desired outcomes for that controller's customer circuit; wherein, in real time response to detected excesses in power for meeting a customer's varying load and desired outcome on a customer circuit, the controllers for that customer circuit preferably autonomously direct the charger/inverter for that customer circuit in real time to preferably send sufficient generated power to load adding parts of the controlled load portions or to preferably charge a storage device to absorb such excess; wherein, in real time response to detected deficiencies in power for meeting a customer's varying load and desired outcome on a customer circuit, the controllers for that customer circuit preferably autonomously disconnect load shedding parts of the controlled load portions or preferably discharge stored power from the storage device to preferably make available power to meet the deficiencies; whereby the controllers preferably autonomously manage in real time the controlled load portions and the charger/inverters to preferably smooth out the power fluctuations (the excess and deficiencies) and to preferably provide power to the grid at the common connection that preferably conforms to the grid participant's desired outcome for that customer circuit.

The controlled load portions in the present inventions described above preferably comprise devices selected from the group consisting of water heaters, air conditioners, space heaters, swimming pool heaters and swimming pool pumps, and can also include energy storage devices and charger/inverters.

For the present inventions (described above) that preferably contain energy storage devices (storage devices), the power generation system, the charger/inverter and the storage device may be preferably connected to a micro grid, connected circuit to preferably power at least a micro grid portion of that power generation and storage customer's varying load, wherein the micro grid connected circuit is preferably connected to the customer circuit, wherein the micro grid connected circuit is preferably connected to the customer circuit by an isolating switch (which could be located in the charger/inverter and optionally act automatically), and the controlled load is preferably connected only to the customer circuit, and not to the micro grid connected circuit, whereby opening the isolating switch preferably isolates the micro grid connected circuit from the grid and from the controlled load; wherein the energy management controller preferably monitors power from the grid and preferably opens the isolating switch when the intermediate circuit is off-line; whereby when the intermediate circuit is off line, critical loads on the micro grid connected circuit can preferably receive stored power through the charger/inverter discharged from the storage device. Of course, the critical loads can also receive power from the power generation system (along with power from the storage device) when the intermediate circuit is off-line.

The critical loads described above preferably comprise devices selected from the group consisting of refrigerators, freezers, medical equipment, lighting, and chargers (e.g. chargers for mobile devices).

The present invention is also preferably a customer circuit for a grid participant customer having a varying load behind a utility meter that is connected at a common connection to an intermediate circuit of a grid, comprising: an intermittent power generation system; a storage device; a charger/inverter linking the power generation system to the storage device that preferably charges the storage device using generated power from the power generation system or preferably discharges stored power from the storage device; energy management controllers preferably connected to (1) a controlled load portion of the varying load, to preferably autonomously control in real time the controlled load portion, by preferably autonomously connecting or disconnecting the controlled load portion from the customer circuit, whereby the controllers preferably allow adding of load adding parts, and shedding of load shedding parts, in real time, of the controlled load portion, and to preferably detect in real time changes in the varying load due to connection and disconnection of the controlled load portions; (2) the charger/inverter, to preferably control in real time the charger/inverter to preferably direct generated power to autonomously charge the storage device, or to preferably autonomously direct generated power or stored power to the customer circuit, to preferably provide power to the varying load, and to preferably detect in real time unpredictably fluctuating generated power of that customer's power generation system; wherein the controllers are preferably downloadably connected to the grid participant so that the grid participant can preferably download selected grid participant rules for achieving desired outcomes for the customer circuit; wherein, in real time response to detected excesses in power for meeting the customer's varying load and the desired outcome at the common connection, the controllers preferably autonomously direct the charger/inverter in real time to send sufficient power to the load adding parts or to preferably autonomously charge the storage device to absorb such excess; wherein, in real time response to detected deficiencies in power for meeting the customer's varying load and desired outcome at the common connection, the controllers preferably autonomously disconnect the load shedding parts of the controlled load portions or preferably autonomously discharge stored power from the storage device to preferably make available power to meet the deficiencies; whereby the controllers autonomously manage in real time the controlled load portions and the charger/inverters to smooth out the power fluctuations (the excess and deficiencies) and to preferably provide power to the grid at the common connection that preferably conforms to the grid participant's desired outcome for the customer circuit.

The incorporation of (preferably autonomous) real-time adaptive controllers into existing and future intermittent power generation systems connected (directly or indirectly) to utility grids mitigates intermittent power related instabilities, thereby allowing connections of additional intermittent power generation systems to grids where it would not otherwise be allowable.

Further, it is believed that the present invention's real time adaptiveness at the customer circuit level requires storage devices with at least fifty (50%) less storage capacity than those of stand-alone systems, thereby significantly decreasing the overall cost of these systems to customers.

The present invention further comprises a method for managing, on a grid operably connected to a grid participant, power factor of an intermediate circuit (having operably connected customer circuits with varying active and reactive loads behind customer utility meters, wherein the customer circuits are connected at common connections to the intermediate circuit), comprising, providing energy management controllers to a connected plurality of the customer circuits to autonomously controllably switch or vary in real time controlled active and reactive load portions of the customer circuits, by autonomously connecting or disconnecting or varying the controlled active and reactive load portions in real time. In this manner, the controllers allow control of the power factor of the connected plurality of customer circuits in real time behind the utility meter. The controllers are downloadably connected to the grid participant so that the grid participant can download to the controllers grid participant rules for the grid participant's desired outcome for the intermediate circuit. The controllers obtain measurements of power factor and power consumption of the connected plurality of customer circuits at the common connections in real time. Each of the controllers is uploadably connected to the grid participant so that the grid participant can upload the measurements of power factor and power consumption of the connected plurality of customer circuits. Weighting the measurements of power factor by power consumption and then averaging provides a weighted averaged measurement of power factor for the customer circuits of the connected plurality of the customers. The weighted averaged measurement of power factor for the connected plurality of said customers is downloaded to the controllers. Thus, in real time response to the weighted averaged measurement of power factor falling outside desired ranges, the controllers in a customer's customer circuit autonomously connect and disconnect and vary the controlled active and reactive load portions to adjust the power factor of that customer circuit in real time behind the utility meter to contribute to meeting the grid participant rules, if the grid participant rules require, based on the weighted averaged measurement.

Preferably, a portion of the reactive loads comprises capacitive loads.

Preferably also, these capacitive loads comprise battery charging devices.

Preferably, the connected plurality of customer circuits is a majority of said customer circuits.

Preferably also, the connected plurality of customer circuits is a portion of the customer circuits that consumes the majority of power on that intermediate circuit.

The present invention also is a method for managing a grid participant's active and reactive power provided to an intermediate circuit (to which each customer's customer circuit is operably connected at a common connection), comprising connecting measuring devices to a connected plurality of the customer circuits at the common connection to measure a power characteristic of the connected plurality in real time, averaging the measurements from the measuring devices to provide an averaged measurement of the power characteristics for the connected plurality; reporting the averaged measurement to the grid participant; and adjusting the grid participant's necessary active and reactive power output according to the averaged measurement by autonomously activating and deactivating and varying active and reactive loads connected to the intermediate circuit in real time.

Preferably, the adjusting step is performed by autonomously activating and deactivating and varying active and reactive loads in real time that are behind the common connection of said customer circuits.

Preferably, the power characteristic is selected from the group consisting of power factor, voltage, and frequency.

Preferably, the connecting step is performed with measuring devices that are selected from the group consisting of energy management controllers and smart meters.

Preferably also, the averaging is weighted averaging by power consumption of each customer circuit.

Preferably, the connected plurality of customer circuits is a majority of the customer circuits.

Preferably, the connected plurality of customer circuits is a portion of said customer circuits that consumes the majority of power on that intermediate circuit.

Preferably, the customer circuits have varying active and reactive loads behind customer utility meters, and the measuring devices are energy management controllers that autonomously controllably switch or vary in real time controlled active and reactive load portions of the customer circuits, by autonomously connecting or disconnecting or varying the controlled active and reactive load portions in real time. In this manner, the controllers allow control of the power characteristic of the connected plurality of customer circuits in real time behind the utility meter. The controllers are downloadably connected to the grid participant so that the grid participant can download to the controllers grid participant rules for the grid participant's desired outcome for the intermediate circuit. The adjusting step is then performed by downloading to the controllers the averaged measurement of the power characteristic for the connected plurality of the customers. Thus, in real time response to the averaged measurement of the power characteristic falling outside desired ranges, the controllers in a customer's customer circuit autonomously connect and disconnect and vary the controlled active and reactive load portions to adjust the power characteristic of that customer circuit in real time behind the utility meter to contribute to meeting the grid participant rules, if the grid participant rules require, based on the averaged measurement.

BRIEF DESCRIPTION OF DRAWING

FIG. 7 is a schematic of a presently preferred embodiment of the invention relating to the utility (or other grid participant) being able to tailor the characteristics of its power output to meet the reactive power needs (or other power characteristic needs) of customer circuits within an intermediate circuit based on aggregating and averaging measurements of power factor (or another power characteristic) from a plurality of energy management controllers (or other measuring devices, such as smart meters) within the intermediate circuit.

BEST MODE FOR CARRYING OUT THE INVENTION

Figure 1:
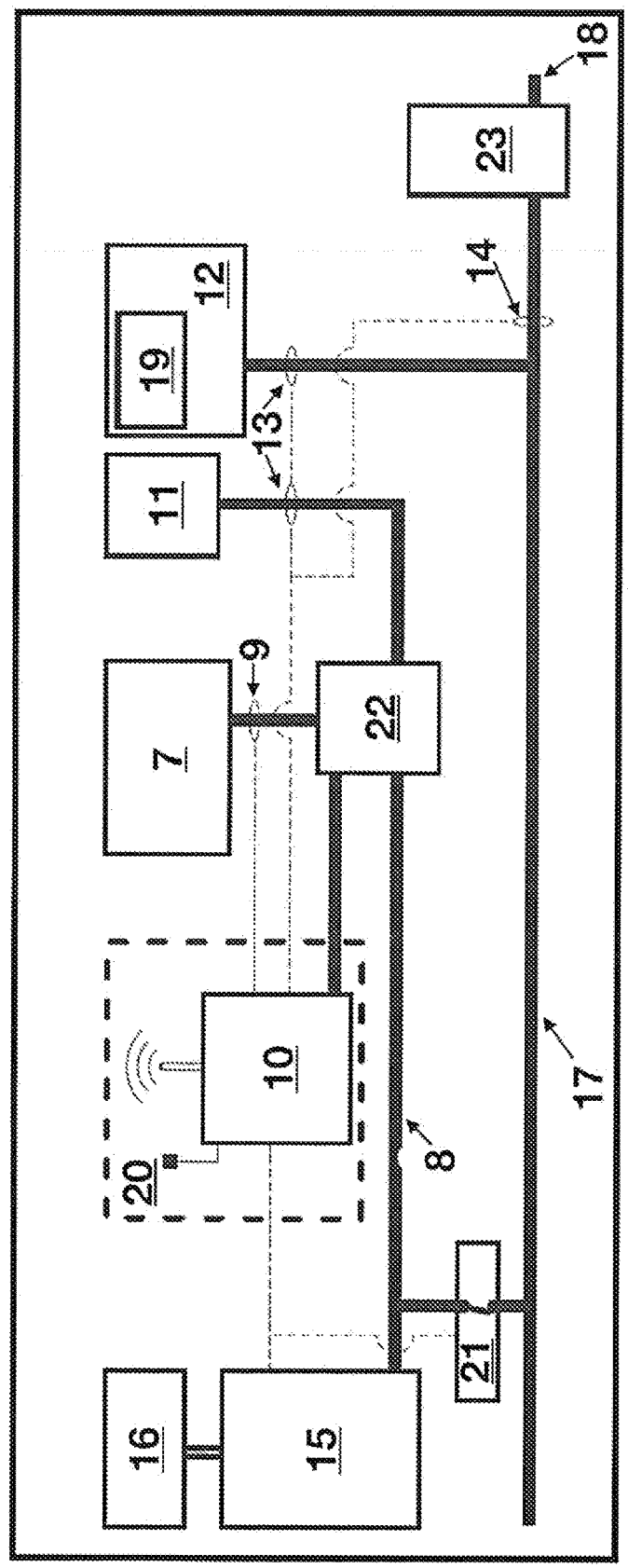
FIG. 1 depicts a first presently preferred embodiment of the invention, which allows for home energy monitoring, load shedding and load adding with energy consuming devices (controlled loads), an intermittent power generation system 7 to make unpredictably fluctuating power (intermittent power), and a storage device (a battery system) 16 to store or export power. The micro grid circuit 8 can be disconnected from the customer circuit 17 to function as a micro grid when the intermediate circuit connected to the utility (or other grid participant) is off-line (i.e. when the grid is down).

The present invention preferably includes energy management controllers (controllers) installed behind the utility meters at residential customers' homes, or at commercial, or other customers' properties, which have intermittent power generation systems ("customers"). The controllers are preferably downloadably connected (directly or indirectly) to the utility (or other grid participant) and preferably control in real time energy producing devices, energy consuming devices, and energy storage devices (storage devices), and measure in real time power that is produced, consumed, stored, or exported to the grid by these devices. The controllers also preferably measure power on customers' circuits located behind the meter hi real time.

For purposes of this disclosure, the term "real time" practically means within fifteen seconds, preferably means within 10 seconds, and optimally means within one second or less.

Each energy management controller preferably bears a unique identifier that can be associated with an intermediate circuit to which it is connected (including but not limited to its nearest transformer, neighborhood circuit, intermediate circuit, and sub-transmission station connected to the utility grid). The controllers preferably use data tags that allow the utility (or other grid participant) to associate the controllers based on reference criteria (such as the intermediate circuit to which the customer circuit is connected, the area in which the customer circuit is located, the customer's type of intermittent power generation system, the direction the customer's intermittent power generation system faces, the geographic characteristics of the terrain around the customer's intermittent power generation system, the capacity of the customer's intermittent power generation system, the type of power usage of the customer, and whether the customer has a storage device). The utility (or other grid participant) preferably aggregates or segregates pluralities of energy management controllers into unlimited desired subsets using the reference criteria and preferably creates updatable utility rules (or other grid participant rules) that are downloadable to the desired subsets of aggregated controllers connected to customer circuits, which themselves are connected to an intermediate circuit, and creates incentive or penalty programs designed to encourage customer participation in the rules to achieve the utility's desired outcome (or other grid participant's desired outcome) for the customers' circuits or aggregated desired outcomes for an intermediate circuit.

For example, the utility (or other grid participant) may create the rule that storage devices will store all or certain amounts of intermittent power to prevent export to the grid during the day, in order to achieve the utility's (or other grid participant's) desired outcome of having zero power exported to an intermediate circuit during the day. If customers having circuits connected to that intermediate circuit, opt in to the rule, their controllers autonomously and in real time manage energy producing devices, energy consuming devices, and any storage devices on the customer's circuit to achieve real time adaptiveness to constant fluctuations in energy production and energy consumption on the customer's circuit to achieve the utility's for other grid participant's) desired outcome for the customer's circuit, aggregate desired outcome for the intermediate circuit to which the customer's circuit is connected, or aggregate desired outcome for the grid.

Each energy management controller preferably acts autonomously from the utility (or other grid participant) and also autonomously from other energy management controllers.

Examples of utility (or other grid participant) desired outcomes can preferably include, but not be limited to, having all of the generated power from an intermediate circuit exported to the grid, or only steady and predictable amounts of power (firm power) exported to the grid, or even no power exported to the grid, during certain times of the day and/or year. Other desired outcomes can include a controlled constant power factor from the power generation system, preferably at the common connection (point of common coupling).

The energy management controllers can also monitor and autonomously react to undesirable grid conditions, such as low grid frequency, low or high voltage conditions and reactive power levels, among others, and act according to certain updatable utility (or other grid participant) rules to correct those conditions, by autonomously charging or discharging storage devices and/or autonomously remotely connecting or disconnecting to the customer circuit controlled loads, to achieve the utility's (or other grid participant's) desired outcomes for the customer circuit.

Once customers decide to take advantage of utility (or other grid participant) incentives and opt in to all, some or none of the utility (or other grid participant) rules, the present invention can be preferably carried out in several different ways, some of which are further illustrated by way of example in the figures.

Referring to FIG. 1, shown is a first presently preferred embodiment of the invention comprising an energy producing device or intermittent power generation system 7 that delivers intermittent power to a micro grid connected circuit 8 through the electrical distribution box 22. The energy management controller 10 preferably continually measures the intermittent power produced in real time by intermittent power generation system 7 at 9. Energy consuming devices, including critical loads 11 and other electric loads 12 draw unpredictable and varying amounts of power from the micro grid connected circuit 8 and customer circuit 17. The energy management controller 10 preferably continually measures power consumed in real time by the critical loads 11 and other electric loads 12 at 13, power exported or imported to and from the intermediate circuit 18 at the point of common coupling 14, and intermittent power produced by the intermittent power generation system 7 at 9, to determine actual load in real time.

In real time response to the power measured continually at 9, 13, and 14, the energy management controller 10 preferably applies in real time certain updatable utility (or other grid participant) rules to manage the power exported to the intermediate circuit 18 through the utility meter 23 by remotely connecting or disconnecting or varying controlled loads (such as water heaters, space heaters, swimming pool pumps, air conditioners, and any other non-critical loads 19, and also including the storage device 16 and charger/inverter 15) to achieve the utility's (or other grid participant's) desired outcomes for the customer circuit 17, aggregate desired outcome for the intermediate circuit 18 connected to the customer circuit 17, or aggregate desired outcome for the grid.

The energy management controller 10 also preferably measures utility power conditions (including, voltage, frequency and power factor) at the point of common coupling 14 in real time. When the utility power conditions are outside defined parameters, the energy management controller 10 preferably acts in real time according to certain updatable utility (or other grid participant) rules to manage behind the utility meter 23 the power exported to the utility grid (through the intermediate circuit 18), by charging or discharging the storage device 16 and/or remotely connecting or disconnecting or varying other controlled loads 19 to the customer circuit 17, to achieve the utility's (or other grid participant's) desired outcomes for the customer circuit 17.

Specifically, the energy management controller 10 preferably directs the charger/inverter 15 to either charge the storage device 16 at varying rates in real time, drawing controlled amounts of power from the micro grid connected circuit 8 and customer circuit 17, or discharge the charger/inverter 15 at varying rates in real time, delivering controlled amounts of power to the micro grid connected circuit 8 and customer circuit 17.

The charger/inverter 15 is preferably a bidirectional inverter that allows for the import and export of power to and from the storage device 16.

The energy management controller 10 also preferably remotely connects (or turns on) the controlled loads 15, 16, 19 to the customer circuit 17 in real time, thereby variably increasing load (load adding), or disconnects (or turns off) the controlled loads 15, 16, 19 from the customer circuit 17 in real time, thereby decreasing load (load shedding). The controlled loads 15, 16, 19 can be added or shed independently from one another. For example, the energy management controller 10 may turn on the water heater, but not the pool pump. The controlled loads 15, 16, 19 are preferably controlled using technology such as Zigbee, which is a wireless protocol that allows household devices (loads) to connect and communicate with each other, or some other wireless protocol providing at least the equivalent functionality. The energy management controller 10 can turn on and off or vary controlled loads 15, 16, 19 and other loads using remotely controllable switches and varying resistors, such as switches and other electrical control components that use the Zigbee or other wireless connecting and communicating protocol.

When the energy management controller 10 determines the intermediate circuit 18 is off-line (for example, if there is an electrical outage), isolating switch 21 is preferably opened, isolating the micro grid connected circuit 8 from the intermediate circuit 18, thereby creating a micro grid. The charger/inverter 15 allows the intermittent power generation system 7 to continue operating together with the storage device 16, providing power to the critical loads 11 (such as refrigerators and freezers). When the energy management controller 10 determines the intermediate circuit 18 is on-line, isolating switch 21 is preferably closed, thereby reconnecting the micro grid connected circuit 8 to the intermediate circuit 18.

This first presently preferred embodiment is appropriate for customers who want to monitor their home load over time and also take advantage of utility (or other grid participant) incentives for avoid utility or other grid participant penalties) by allowing their energy management controller (controller) to autonomously and in real time manage energy producing devices, energy consuming devices, and storage devices on that customer's circuit to achieve real time adaptiveness to constant fluctuations in intermittent power produced, to achieve the utility's (or other grid participant's) desired outcomes for that customer circuit. Customers also have the added advantage of having emergency power (as provided by the power generation system or the storage system, or both) for their critical loads when the intermediate circuits are off-line (i.e. the grid is down).

Figure 2:
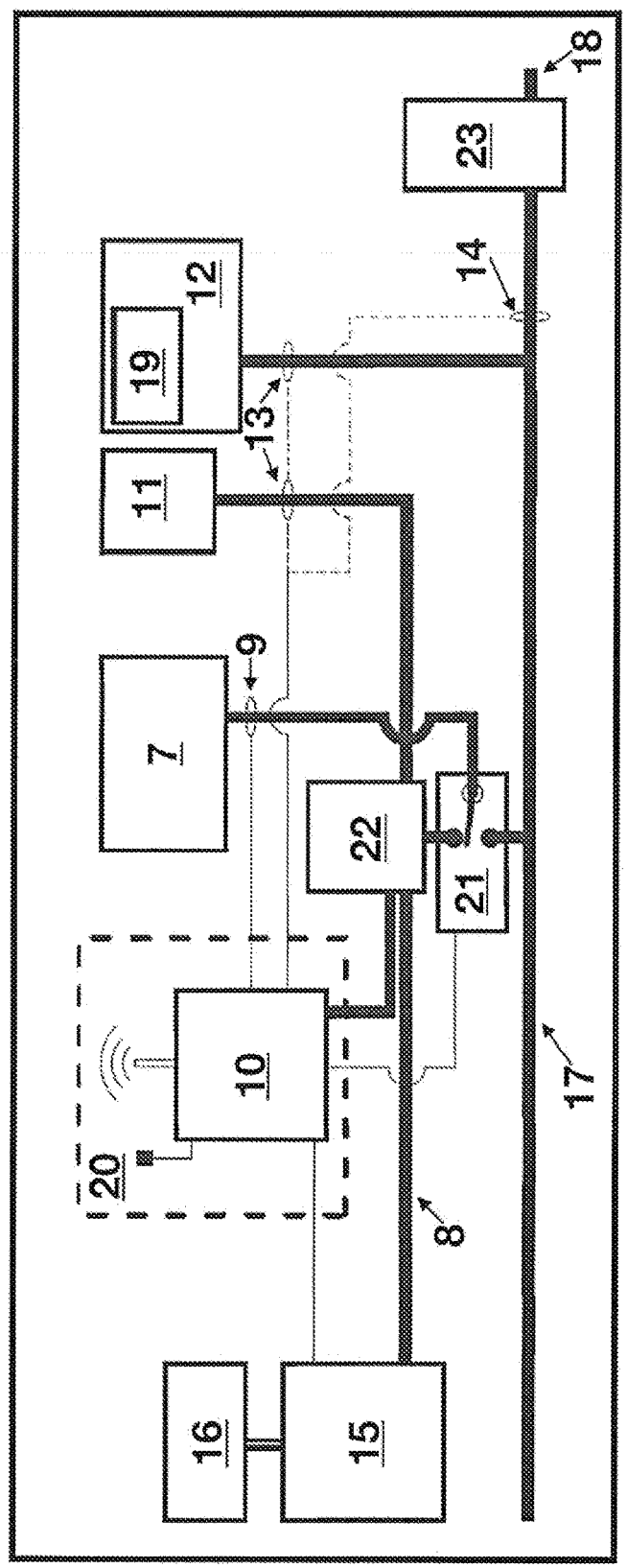
FIG. 2 depicts a second presently preferred embodiment of the invention that is similar to the first embodiment, except that the micro grid circuit is created when the intermittent power generation system 7 is connected to the micro grid circuit 8 at the electric distribution box 22. Otherwise, the intermittent power generation system 7 is normally connected to the customer circuit 17.

Referring to FIG. 2, shown is a second presently preferred embodiment of the invention. This embodiment functions like the first embodiment, except that the micro grid is created when the isolating switch 21 is opened and the intermittent power generation system 7 is connected to the micro grid connected circuit 8 at the electric distribution box 22. When the intermediate circuit 18 is on-line and micro grid connected circuit 8 is not necessary, isolating switch 21 is preferably closed and the intermittent power generation system 7 is connected to the customer circuit 17.

Figure 3:
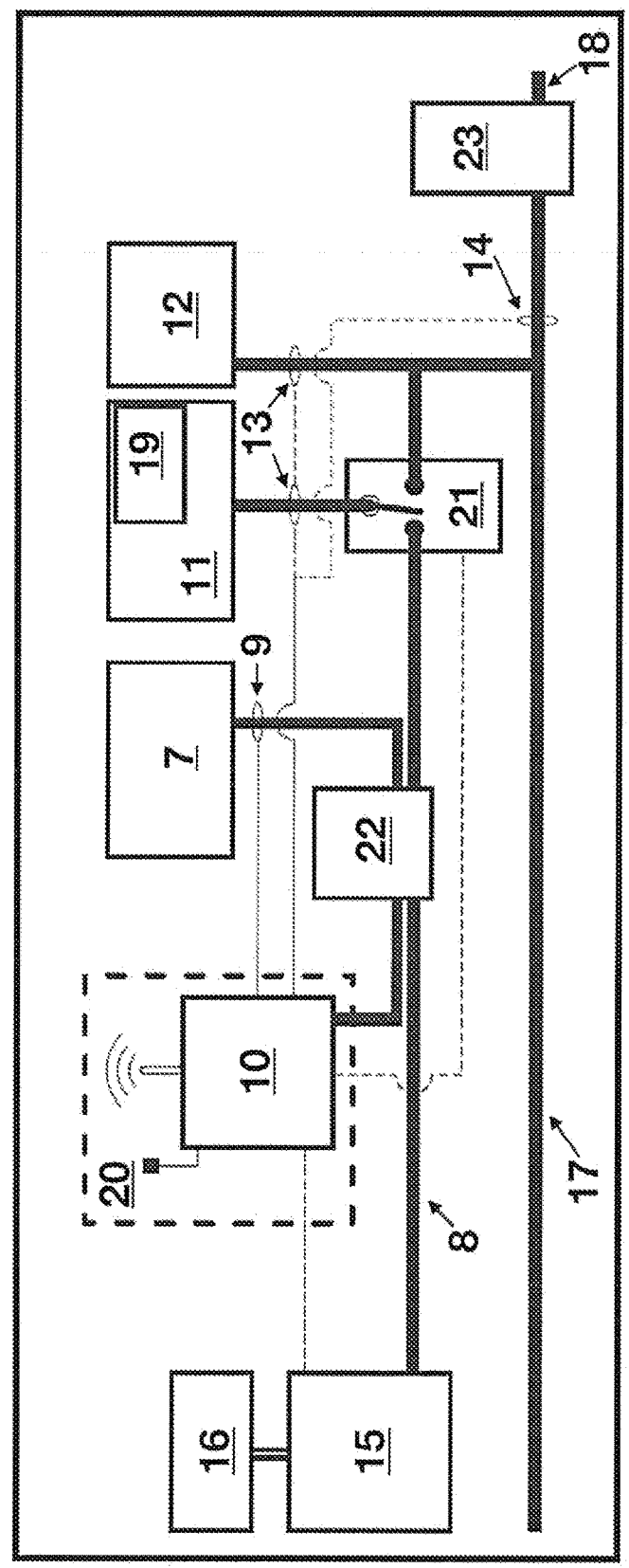
FIG. 3 depicts a third presently preferred embodiment of the present invention which also allows for the isolation of a micro grid circuit when the intermediate circuit connected to the utility (or other grid participant) 18 is off line (i.e. when the grid is down) to power critical loads 11 (including but not limited to refrigerators, freezers, medical equipment, lighting, chargers for mobile devices (such as phone chargers), and other critical loads). The micro grid circuit is created when the controlled load 19 and critical loads 11 are connected to the micro grid circuit 8.

Referring to FIG. 3, shown is a third presently preferred embodiment of the invention comprising an intermittent power generation system 7 that delivers intermittent power through the electric distribution box 22 to the micro grid connected circuit 8. The energy management controller 10 continually measures power produced by the intermittent power generation system 7 at 9 in real time. Other electric loads 12 draw unpredictable and varying amounts of power from the customer circuit 17, and critical electric loads 11 draw unpredictable and varying amounts of power from the micro grid connected circuit 8 and/or the customer circuit 17. The energy management controller 10 continually measures in real time power at 13 or 14, preferably separating out the intermittent power produced by the intermittent power generation system 7 at 9 to determine actual load.

The energy management controller 10 preferably acts according to certain updatable utility (or other grid participant) rules to manage power on the micro grid connected circuit 8 by charging or discharging the storage device 16 (drawing or delivering power to or from the micro grid connected circuit 8 to the storage device 16), and/or remotely connecting or disconnecting controlled loads 15, 16, 19 and critical loads 11 to the micro grid connected circuit 8 or customer circuit 17 in real time response to the power continually measured at 9, 13, and 14 to achieve the utility's (or other grid participant's) desired outcomes at the intermediate circuit level.

For example, if the energy management controller 10 determines that there is enough power from the charger/inverter 15 and/or the intermittent power generation system 7 to power critical electric loads 11 and controlled loads 15, 16, 19, isolating switch 21 is connected in real time to the micro grid connected circuit 8 thereby creating a micro grid. When the energy management controller 10 determines there is not enough power available to power critical electric loads. 11 and controlled loads 19 (including the storage device 16 and charger/inverter 15), isolating switch 21 is connected to the customer circuit 17 in real time, thereby connecting the critical loads 11 and controlled loads 15, 16, 19 to the customer circuit 17 connected to the intermediate circuit 18. The other electric loads 12 receive power from the intermediate circuit 18 through the utility meter 23 and the customer circuit 17.

The energy management controller 10 also preferably directs in real time the charger/inverter 15 to store in the storage device 16 excess intermittent power produced by the intermittent power generation system 7, or to export excess power to feed the critical loads 11 and controlled loads 15, 16, 19 when they are connected to the micro grid connected circuit 8.

Figure 4:
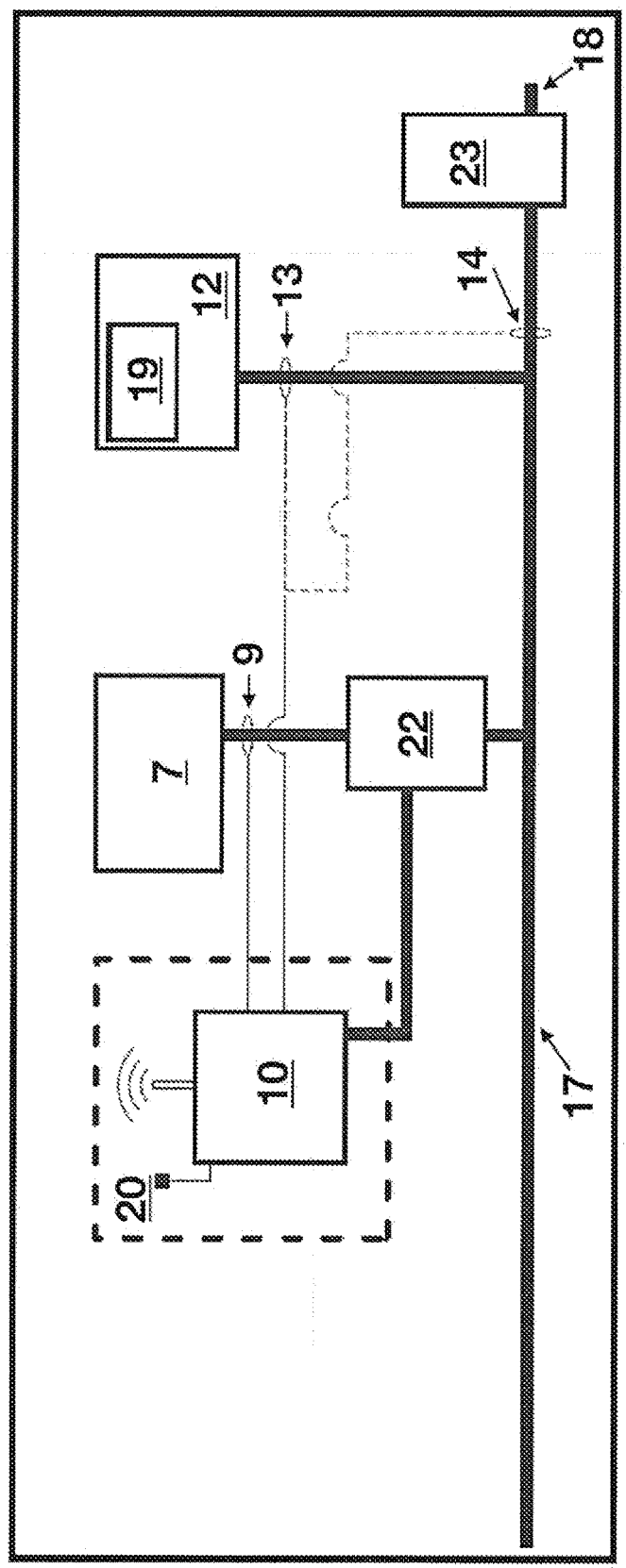
FIG. 4 depicts a fourth presently preferred embodiment of the present invention which allows for home energy monitoring, load shedding and load adding with controlled loads 19, and an intermittent power generation system 7 to make electricity. This embodiment does not contain, a storage device.

Referring to FIG. 4, shown is a fourth presently preferred embodiment of the invention. The fourth embodiment does not contain a separate micro grid connected circuit with the ability to isolate that micro grid circuit when the intermediate circuit is off-line. It also does not contain a charger/inverter or storage device.

Instead, it preferably comprises an intermittent power generation system 7 that delivers unpredictable and varying amounts of power to the customer circuit 17 and other electric loads 12 that draw unpredictable and varying amounts of power from the customer circuit 17. The controller 10 preferably continually measures power consumed by loads at 13, and power exported or imported to and from the intermediate circuit at the point of common coupling 14, separating out the intermittent power produced by the intermittent power generation system 7 at 9, to determine actual load in real time.

The energy management controller 10 preferably acts according to certain updatable utility (or other grid participant) rules to manage intermittent power from the intermittent power generation, system entering, the intermediate circuit 18 (connected to the grid) through the utility meter 23 by remotely varying or connecting controlled loads 19 to the customer circuit 17, thereby increasing load, or varying or disconnecting controlled loads 19 from customer circuit 17, thereby decreasing load, in real time response to the power continually measured at 9, 13, and 14, to achieve the utility's (or other grid participant's) desired outcomes.

The fourth presently preferred embodiment can be used by customers to monitor their home load over time and take advantage of utility (or other grid participant) incentives (and/or avoid utility or other grid participant penalties) for achieving the utility's (or other grid participant's) desired outcomes by using controlled loads at specific times of the day and/or limiting or allowing the export of renewable energy to the grid at specific times of the day.

Figure 5:
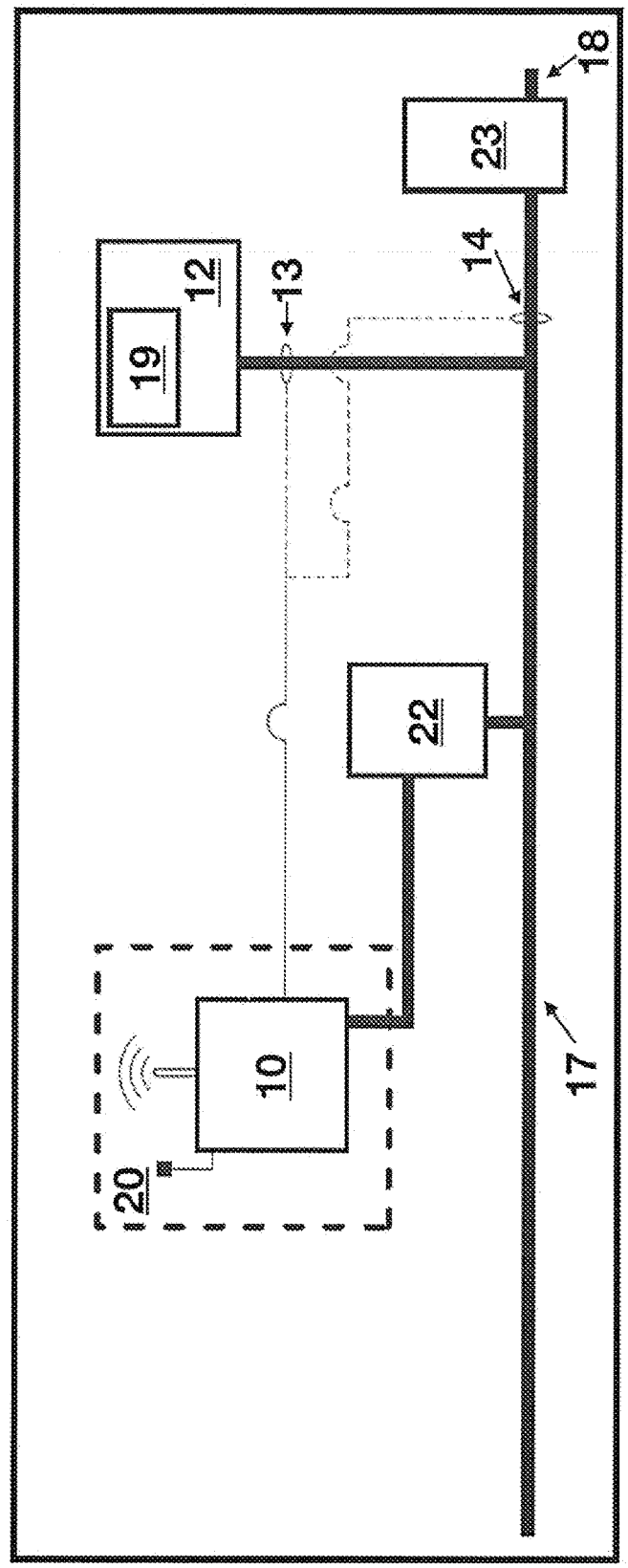
FIG. 5 depicts a fifth presently preferred embodiment for the present invention which allows for home energy monitoring and load shedding and load adding with controlled loads 19. This embodiment is appropriate for customers who do not have an intermittent power generation system or a storage device (battery).

Referring to FIG. 5, shown is a fifth presently preferred embodiment of the invention. The fifth embodiment does not contain a separate micro grid connected circuit, an storage device, or an intermittent power generation system. It comprises electric loads 12 that draw unpredictable and varying amounts of power from the customer circuit 17, and an energy management controller 10 that continually measures power consumed by the electric loads at 13, or power exported or imported to and from the intermediate circuit at the point of common coupling 14 to determine actual load.

The energy management controller 10 acts according to updatable utility (or other grid participant) rules in real time in response to its measurement of actual load to manage power entering the intermediate circuit 18 by varying or connecting controlled loads 19 to the customer circuit 17, thereby increasing load, or varying or disconnecting them from the customer circuit 17, thereby decreasing load, to achieve the utility's (or other grid participant's) desired outcomes.

This fifth presently preferred embodiment is useful for customers who do not have intermittent power generation systems, but who nonetheless want to monitor their home load over time and also take advantage of utility (or other grid participant) incentives (and/or avoid utility or other grid, participant penalties) for achieving the utility's (or other grid participant's) desired outcomes by using their controlled loads only at specific times according to the incentives or penalties.

Figure 6:
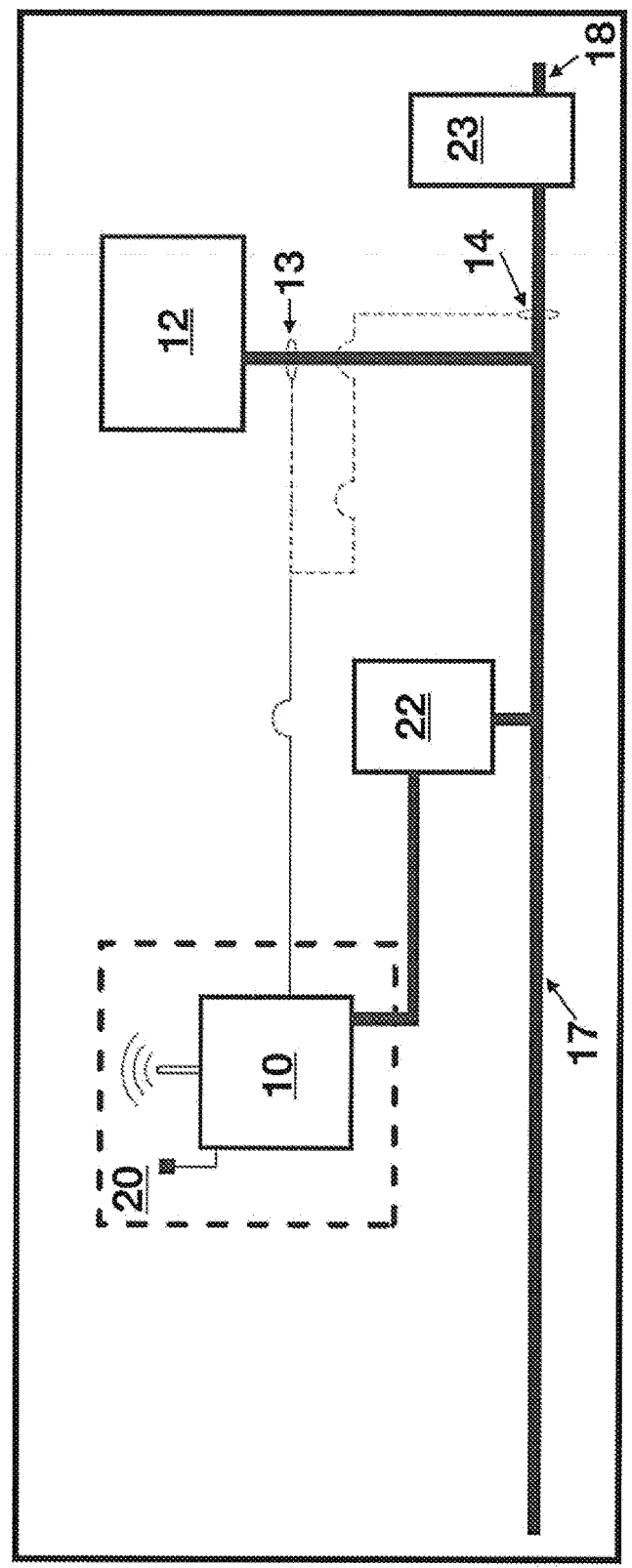
FIG. 6 depicts a sixth presently preferred embodiment for the present invention which allows for only home energy monitoring. This embodiment is appropriate for customers who do not have an intermittent power generation system, storage device, or controlled loads.

Referring to FIG. 6, shown is a sixth presently preferred embodiment of the invention. This embodiment is useful when customers do not have an intermittent power generation system, storage device or controlled loads, but nonetheless want to monitor their home load over time. It comprises only electric loads 12 drawing unpredictable and varying amounts of power from the customer circuit 17, and an energy management controller 10 that continually measures power at 13 and 14 to determine actual load.

Referring to FIG. 7, shown is another presently preferred embodiment of the invention that preferably measures utility power conditions (including, voltage, frequency, power factor, and other power characteristics) from a plurality of energy management controllers (or other measuring devices, such as smart meters) connected to customer circuits (within an intermediate circuit) at the point of common coupling. A grid participant 2 provides power to intermediate circuits 1. Conventionally, the grid participant 2 has no information about the power characteristics of individual customer circuits connected to the intermediate circuit, as shown on the right of FIG. 7. But in the intermediate circuit shown on the left of FIG. 7, a connected plurality of customer circuits 3, 4 and 5 has energy management controllers, smart meters, or other devices that can monitor and autonomously control in real time active and reactive loads on those customer circuits (it is not necessary that every customer circuit have such devices). The devices upload to the grid participant 2 measurements of active and reactive power and power consumption. The measurements are preferably averaged, or weighted averaged, as appropriate, for each power characteristic. A simple average may not be appropriate for some power characteristics. For example, two customers may have different power factors, but one customer may draw much more power from the grid than the other. A simple average of the two different power factors would not take into account that one customer draws much more power than the other, so a weighted average taking into account the difference in power being drawn should be used.

The utility (or some other grid participant) preferably downloads updateable utility rules to the energy management controllers for the connected plurality of customer circuits 3, 4, 5 setting forth desired parameters for the power characteristics for the intermediate circuit. Each of the controllers thereafter independently acts autonomously and in real time to correct the power characteristics for its specific customer circuit only if the averaged, or weighted averaged, as appropriate, measurement for the intermediate circuit 1 falls outside the parameters for the power characteristics set forth in the utility rule. For example, the controllers can (independently of each other) act autonomously in real time to direct an energy storage device to absorb or supply a portion of real power and/or reactive power; or can act autonomously to turn on and off or vary active or reactive loads, to adjust the power characteristic (such as power factor) of a connected customer circuit in order to achieve the utility desired outcome for the power characteristic for the entire intermediate circuit 1.

For example, individual customer circuits on an intermediate circuit will probably have different power factors. The utility could download a utility rule requiring no action from the energy management controllers when the weighted averaged measurement of the power factor (or other power characteristic) for the entire intermediate circuit is above a certain value. If the weighted averaged measurement falls below that value, the rule may require the controllers (independently of each other to turn on or off or vary controllable loads (or do other things) on customers' circuits 3, 4, 5 to help adjust the power factor (or other power characteristic) of the entire intermediate circuit 1.

The weighted, averaged measurements from energy management controllers (or other measuring devices) of a connected plurality of customer circuits 3, 4, 5 provide a better estimate of the reactive power needs (or other power characteristic needs) for an intermediate circuit 1, than an individual measurement from an individual energy management controller (or other measuring device), because the reactive power needs (or other power characteristic needs) for one customer on an intermediate circuit may be met by another customer's reactive power (or other power characteristic) on the same intermediate circuit, so that in aggregate and on a weighted average basis, there is no net reactive power need (or other power characteristic need) for the intermediate circuit.

Although it would be optimal to obtain measurements of power factor (or other power characteristics) from all customers on an intermediate circuit to create the averaged or weighted averaged measurements of power factor (or other power characteristics), not all customers on an intermediate circuit may have energy management controllers or agree to provide information about power factor (or other power characteristics). However, because grid participants at present have no information at all about power factor (or other power characteristics) of individual customer circuits, let alone averaged or weighted averaged information for a connected plurality of customer circuits, it would be practical to obtain measurements of power factor (or other power characteristics) from energy management controllers for at least a connected plurality of customers, and preferable to obtain measurements of such information from customers consuming at least a majority of the power on the intermediate circuit.

In all the preferred embodiments, the energy management controller 10 continually records the status and activities of the energy producing devices, energy storage devices, and energy consuming devices, as well as the power on circuits, preferably continually uploading the information to the Internet 20. The information is preferably used to determine the real time adaptiveness of customers circuits and/or customer participation, in utility (or other grid participant) rules and can be accessed by the utility (or other grid participant) and the customer; however, this information is preferably aggregated and anonymized (de-identified) by an aggregator to avoid disclosing power use data (at the customer circuit level) to the utility (or other grid participant).

The utility (or other grid participant) can use the aggregated and de identified information to accurately model various challenges to the grid, and to redesign and modify its incentive or penalty programs, as necessary, to encourage more customers to opt in to all or some of its utility (or other grid participant) rules. Customers, however, always retain the ability to elect whether to participate in the utility (or other grid participant) rules or not, based on their energy needs and habits and the associated incentives or penalties.

In all the preferred embodiments, the energy management controller preferably incorporates a small internal battery power supply, allowing it to operate even if it is not receiving power from another source (such as the micro grid connected circuit or the customer circuit).

While the present invention has been disclosed in connection with the presently preferred embodiments described herein, it should be understood that there may be other embodiments which fall within the spirit and scope of the invention as defined by the appended claims. Accordingly, no limitations are to be implied or inferred in this invention except as specifically and as explicitly set forth in the appended claims.

INDUSTRIAL APPLICABILITY

This invention can be used whenever real time adaptiveness at the customer circuit level is desired for the management of power generated from intermittent power generation systems at residential, commercial, industrial or other properties.

What is claimed is:

1. A method for managing, on a grid operably connected to a grid participant, power factor of an intermediate circuit having operably connected customer circuits with varying active and reactive loads behind customer utility meters, wherein said customer circuits are connected at common connections to said intermediate circuit, comprising:

providing energy management controllers to a connected plurality of said customer circuits to autonomously controllably switch or vary in real time controlled active and reactive load portions of said customer circuits, by autonomously connecting or disconnecting or varying said controlled active and reactive load portions in real time, whereby the controllers allow control of said power factor of said connected plurality of customer circuits in real time behind the utility meter;

wherein said controllers are downloadably connected to said grid participant so that said grid participant can download to the controllers grid participant rules for said grid participant's desired outcome for said intermediate circuit;

wherein said controllers obtain measurements of power factor and power consumption of said connected plurality of customer circuits at said common connections in real time;

wherein each of said controllers is uploadably connected to said grid participant so that said grid participant can upload said measurements of power factor and power consumption of said connected plurality of customer circuits;

weighting said measurements of power factor by power consumption and then averaging to provide a weighted averaged measurement of power factor for said customer circuits of said connected plurality of said customers;

downloading to said controllers said weighted averaged measurement of power factor for said connected plurality of said customers;

wherein, in real time response to said weighted averaged measurement of power factor falling outside desired ranges, said controllers in a customer's customer circuit autonomously connect and disconnect and vary said controlled active and reactive load portions to adjust said power factor of that customer circuit in real time behind said utility meter to contribute to meeting said grid participant rules, if said grid participant rules require, based on said weighted averaged measurement.

2. A method according to claim 1, wherein a portion of said reactive load portions comprises capacitive loads.

3. A method according to claim 2, wherein said capacitive loads comprise battery charging devices.

4. A method according to claim 1, wherein a portion of said reactive load portions comprises inductive loads.

5. A method according to claim 1, wherein said connected plurality of customer circuits is a majority of said customer circuits.

6. A method according to claim 1, wherein said connected plurality of customer circuits is a portion of said customer circuits that consumes the majority of power on that intermediate circuit.

7. A method for managing a grid participant's active and reactive power provided to an intermediate circuit having operably connected customer circuits connected at a common connection, comprising:
   connecting measuring devices to a connected plurality of said customer circuits at said common connection to measure a power characteristic of said connected plurality in real time, wherein said power characteristic is selected from the group consisting of power factor, voltage, and frequency;
   averaging said measurements from said measuring devices to provide an averaged measurement of said power characteristic for said connected plurality, wherein said averaging is weighted averaging by power consumption of each customer circuit;
   reporting said averaged measurement to said grid participant;
   adjusting said grid participant's necessary active and reactive power output according to said averaged measurement by autonomously activating and deactivating and varying active and reactive loads connected to said intermediate circuit in real time.

8. A method according to claim 7, wherein said adjusting step is performed by autonomously activating and deactivating and varying active and reactive loads in real time that are behind said common connection of said customer circuits.

9. A method according to claim 7, wherein said connecting step is performed with measuring devices that are selected from the group consisting of energy management controllers and smart meters.

10. A method according to claim 7, wherein said connected plurality of customer circuits is a majority of said customer circuits.

11. A method according to claim 7, wherein said connected plurality of customer circuits is a portion of said customer circuits that consumes the majority of power on that intermediate circuit.

12. A method according to claim 7, wherein said customer circuits have varying active and reactive loads behind customer utility meters, wherein said measuring devices are energy management controllers that autonomously controllably switch or vary in real time controlled active and reactive load portions of said customer circuits, by autonomously connecting or disconnecting or varying said controlled active and reactive load portions in real time, whereby the controllers allow control of said power characteristic of said connected plurality of customer circuits in real time behind the utility meter;
   wherein said controllers are downloadably connected to said grid participant so that said grid participant can download to the controllers grid participant rules for said grid participant's desired outcome for said intermediate circuit;
   wherein said adjusting step is performed by:
   downloading to said controllers said averaged measurement of said power characteristic for said connected plurality of said customers;
   wherein, in real time response to said averaged measurement of said power characteristic falling outside desired ranges, said controllers in a customer's customer circuit autonomously connect and disconnect and vary said controlled active and reactive load portions to adjust said power characteristic of that customer circuit in real time behind said utility meter to contribute to meeting said grid participant rules, if said grid participant rules require, based on said averaged measurement.

* * * * *